United States Patent
Kawasaki

(10) Patent No.: US 8,830,528 B2
(45) Date of Patent: Sep. 9, 2014

(54) IMAGE FORMING APPARATUS

(71) Applicant: KYOCERA Document Solutions Inc., Osaka (JP)

(72) Inventor: Tomohiro Kawasaki, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/096,309

(22) Filed: Dec. 4, 2013

(65) Prior Publication Data

US 2014/0176968 A1 Jun. 26, 2014

(30) Foreign Application Priority Data

Dec. 26, 2012 (JP) ................................. 2012-282081

(51) Int. Cl.
*H04N 1/60* (2006.01)
*G06K 15/02* (2006.01)
*G06F 15/00* (2006.01)

(52) U.S. Cl.
CPC ....................................... *G06K 15/02* (2013.01)
USPC ........... 358/1.9; 358/2.1; 358/3.27; 358/3.01; 358/3.26; 358/1.18; 382/166; 382/165; 382/167

(58) Field of Classification Search
None
See application file for complete search history.

(56) References Cited

U.S. PATENT DOCUMENTS

2007/0166059 A1* 7/2007 Kin et al. ................. 399/27
2011/0229027 A1* 9/2011 Shibuya ................... 382/166

FOREIGN PATENT DOCUMENTS

JP 2003-076232 3/2003
JP 2007-078794 3/2007

* cited by examiner

*Primary Examiner* — Quang N Vo

(57) ABSTRACT

The blocking unit generates first block property data having a first value if all pixels in the block image do not have a color of the color plane, and generates first block property data having a second value if at least one pixel in the block image has the color. The gamma correction unit performs gamma correction for the block image having the second value and does not perform gamma correction for the block image having the first value. The screen process unit generates a block dot image by performing a screen process for the block image after the gamma correction. The toner adhesion amount calculating unit identifies values of the first block property data of block images adjacent to an objective block image, and identifies the toner adhesion amount of the object block as a value changed correspondingly to the identified values of the first block property data.

9 Claims, 12 Drawing Sheets

FIG. 3

| PLANE | BLOCK COORDINATE (HEIGHT DIRECTION) | BLOCK COORDINATE (WIDTH DIRECTION) | D1 (NON-WHITE FLAG) | D2 (FILL COLOR VALUE) | ADDRESS |
|---|---|---|---|---|---|
| CYAN | 0 | 0 | 0 | 0 | 0x0000 |
| CYAN | 0 | 1 | 0 | 0 | 0x0000 |
| CYAN | 0 | 2 | 0 | 0 | 0x0000 |
| CYAN | 0 | 3 | 0 | 0 | 0x0000 |

| CYAN | 99 | 100 | 1 | 0 | 0x8000 |
|---|---|---|---|---|---|

| CYAN | 100 | 99 | 0 | 0 | 0x0000 |
|---|---|---|---|---|---|
| CYAN | 100 | 100 | 1 | 0 | 0x8004 |
| CYAN | 100 | 101 | 0 | 0 | 0x0000 |

| CYAN | 101 | 100 | 1 | 0 | 0x8008 |
|---|---|---|---|---|---|

| CYAN | 1000 | 1000 | 0 | 0 | 0x0000 |
|---|---|---|---|---|---|
| MAGENTA | 0 | 0 | 0 | 0 | 0x0000 |

| MAGENTA | 1000 | 1000 | 0 | 0 | 0x0000 |
|---|---|---|---|---|---|
| YELLOW | 0 | 0 | 0 | 0 | 0x0000 |

| YELLOW | 1000 | 1000 | 0 | 0 | 0x0000 |
|---|---|---|---|---|---|
| BLACK | 0 | 0 | 0 | 0 | 0x0000 |

| BLACK | 1000 | 1000 | 0 | 0 | 0x0000 |
|---|---|---|---|---|---|

FIG. 4

| COLOR VALUE | BLOCK DOT IMAGE DATA | |
|---|---|---|
| | VALUES | IMAGE |
| 1 | 0 0 0 0<br>0 0 0 0<br>0 0 0 0<br>1 0 0 0 | |
| 2 | 0 0 0 0<br>0 0 1 0<br>0 0 0 0<br>1 0 0 0 | |
| 16 | 0 0 0 0<br>0 0 7 0<br>0 0 0 0<br>8 0 0 0 | |
| 32 | 0 0 0 1<br>0 0 13 0<br>0 1 0 0<br>14 0 0 0 | |
| 64 | 0 0 0 5<br>0 0 15 9<br>0 5 0 0<br>15 10 0 0 | |

| COLOR VALUE | BLOCK DOT IMAGE DATA | |
|---|---|---|
| | VALUES | IMAGE |
| 128 | 15 0 0 15<br>0 0 15 15<br>0 15 15 0<br>15 15 0 0 | |
| 192 | 15 15 0 15<br>15 0 15 15<br>0 15 15 15<br>15 15 15 0 | |
| 224 | 15 15 15 15<br>15 1 15 15<br>15 15 15 15<br>15 15 15 0 | |
| 255 | 15 15 15 15<br>15 15 15 15<br>15 15 15 15<br>15 15 15 15 | |

FIG. 5

| COLOR VALUE | BLOCK DOT IMAGE DATA | | COLOR VALUE | BLOCK DOT IMAGE DATA | |
|---|---|---|---|---|---|
| | VALUES | IMAGE | | VALUES | IMAGE |
| 1 | 0 0 0 0<br>0 0 1 0<br>0 0 0 0<br>1 0 0 0 | | 128 | 15 0 0 15<br>0 0 15 15<br>0 15 15 0<br>15 15 0 0 | |
| 2 | 0 0 0 1<br>0 0 1 0<br>0 0 0 0<br>1 0 0 0 | | 192 | 15 14 1 15<br>14 1 15 15<br>1 15 15 14<br>15 15 14 1 | |
| 16 | 0 0 0 4<br>0 0 4 0<br>0 3 0 0<br>4 0 0 0 | | 224 | 15 14 9 15<br>14 8 15 15<br>9 15 15 14<br>15 15 14 8 | |
| 32 | 0 0 0 8<br>0 0 8 0<br>0 7 0 0<br>8 0 0 0 | | 255 | 15 15 15 15<br>15 15 15 15<br>15 15 15 15<br>15 15 15 15 | |
| 64 | 0 0 0 15<br>0 0 15 0<br>0 15 0 0<br>15 0 0 0 | | | | |

FIG. 6

| ID | BLOCK DOT IMAGE DATA ||
|---|---|---|
| | VALUES | IMAGE |
| 1 | 0  0  0  0<br>0 15 15 10<br>0 15 15  0<br>0  0  0  0 | |
| 2 | 15 0 15 0<br>15 0 15 0<br>15 0 15 0<br>15 0 15 0 | |
| 3 | 15 15 0 0<br>15 15 0 0<br>15 15 0 0<br>15 15 0 0 | |
| 4 | 8 0 8 0<br>0 8 0 8<br>8 0 8 0<br>0 8 0 8 | |

| COLOR VALUE | | TONER ADHESION AMOUNT (MICRO GRAM / PIXEL) | | | |
| --- | --- | --- | --- | --- | --- |
| BEFORE GAMMA CORRECTION | AFTER GAMMA CORRECTION | STANDARD VALUE | UPSIDE,DOWNSIDE = WHITE | LEFTSIDE,RIGHTSIDE = WHITE | 4 ADJACENTS = WHITE |
| 1 | 1 | 0.0001 | 0.0000 | 0.0001 | 0.0000 |
| 2 | 2 | 0.0002 | 0.0001 | 0.0002 | 0.0001 |
| ⋮ | | | | | |
| 16 | 15 | 0.0012 | 0.0013 | 0.0014 | 0.0015 |
| ⋮ | | | | | |
| 32 | 31 | 0.0046 | 0.0048 | 0.0050 | 0.0052 |
| ⋮ | | | | | |
| 64 | 65 | 0.0230 | 0.0232 | 0.0235 | 0.00235 |
| ⋮ | | | | | |
| 128 | 128 | 0.0400 | 0.0410 | 0.0430 | 0.00430 |
| ⋮ | | | | | |
| 192 | 192 | 0.0620 | 0.0620 | 0.0620 | 0.00620 |
| ⋮ | | | | | |
| 224 | 224 | 0.0780 | 0.0780 | 0.0780 | 0.0780 |
| ⋮ | | | | | |
| 255 | 255 | 0.0948 | 0.0948 | 0.0948 | 0.0948 |

FIG. 8

| COLOR VALUE | | TONER ADHESION AMOUNT (MICRO GRAM / PIXEL) | | | |
|---|---|---|---|---|---|
| BEFORE GAMMA CORRECTION | AFTER GAMMA CORRECTION | STANDARD VALUE | UPSIDE,DOWNSIDE = WHITE | LEFTSIDE,RIGHTSIDE = WHITE | 4 ADJACENTS = WHITE |
| 1 | 1 | 0.0001 | 0.0001 | 0.0001 | 0.0001 |
| 2 | 2 | 0.0002 | 0.0003 | 0.0002 | 0.0003 |
| ⋮ | | | | | |
| 16 | 15 | 0.0012 | 0.0013 | 0.0014 | 0.0015 |
| ⋮ | | | | | |
| 32 | 31 | 0.0046 | 0.0048 | 0.0050 | 0.0052 |
| ⋮ | | | | | |
| 64 | 65 | 0.0230 | 0.0240 | 0.0241 | 0.00241 |
| ⋮ | | | | | |
| 128 | 128 | 0.0400 | 0.0410 | 0.0430 | 0.00430 |
| ⋮ | | | | | |
| 192 | 192 | 0.0627 | 0.0627 | 0.0627 | 0.00627 |
| ⋮ | | | | | |
| 224 | 224 | 0.0749 | 0.0749 | 0.0749 | 0.0749 |
| ⋮ | | | | | |
| 255 | 255 | 0.0948 | 0.0948 | 0.0948 | 0.0948 |

FIG. 9

| ID | TONER ADHESION AMOUNT (MICRO GRAM / PIXEL) | | | |
|---|---|---|---|---|
| | STANDARD VALUE | UPSIDE,DOWNSIDE = WHITE | LEFTSIDE,RIGHTSIDE = WHITE | 4 ADJACENTS = WHITE |
| 1 | 0.0250 | 0.0300 | 0.0300 | 0.0300 |
| 2 | 0.0200 | 0.0200 | 0.0200 | 0.0220 |
| 3 | 0.0300 | 0.0300 | 0.0500 | 0.0550 |
| 4 | 0.0500 | 0.0500 | 0.0200 | 0.0500 |

⋮

IMAGE FORMING APPARATUS

CROSS-REFERENCE TO RELATED APPLICATIONS

This application relates to and claims priority rights from Japanese Patent Application No. 2012-282081, filed on Dec. 26, 2012, the entire disclosures of which are hereby incorporated by reference herein.

BACKGROUND

1. Field of the Present Disclosure

The present disclosure relates to an image forming apparatus.

2. Description of the Related Art

Recently, for a purpose such as a control of printing cost, it is strongly required to precisely identify a toner adhesion amount in a printing process on the basis of image data.

An image forming apparatus identifies a toner adhesion amount (i.e. weight of consumed toner) for printing a CMYK (Cyan, Magenta, Yellow, Black) image from the image before screening and a gamma correction on the basis of a toner adhesion amount per unit area.

Further, an image forming apparatus precisely identifies a toner adhesion amount by correcting a toner adhesion amount of each objective pixel with consideration to existence of dots on adjacent pixels to the objective pixel.

In the case that a dot pattern around an objective pixel is identified and a toner adhesion amount is identified with consideration to the dot pattern, as mentioned, a large surrounding area considered to identify the dot pattern results in precise identification of the toner adhesion amount. However, if a surrounding area considered to identify the dot pattern is large, a long computation time is required to identify a dot pattern around the objective pixel.

For example, in a case that no dots exist in a surrounding area, an edge effect appears more strongly and a toner adhesion amount is larger than that in a case that a dot exists in a surrounding area. Further, in a case that a dot exists in a surrounding area, a halo phenomenon appears more strongly and a toner adhesion amount is less than that in a case that no dots exist in a surrounding area.

SUMMARY

An image forming apparatus according to an aspect of the present disclosure, includes a blocking unit, a gamma correction unit, a screen process unit, and a toner adhesion amount calculating unit. The blocking unit is configured (a) to generate first block property data having a first value that indicates that all pixels in a block image of a predetermined size obtained by dividing a color plane of an output image do not have a color of the color plane if all pixels in the block image do not have a color of the color plane, and (b) to generate first block property data having a second value that indicates that at least one pixel in the block image has a color of the color plane if at least one pixel in the block image has a color of the color plane. The gamma correction unit is configured to perform gamma correction for the block image having the second value and not to perform gamma correction for the block image having the first value. The screen process unit is configured to generate a block dot image by performing a screen process for the block image for which the gamma correction has been performed. The toner adhesion amount calculating unit is configured, in order to calculate a toner adhesion amount of an objective block image in a color plane, (a) to identify values of the first block property data of plural block images adjacent to the objective block image, and (b) to identify the toner adhesion amount of the object block as a value changed correspondingly to the identified values of the first block property data.

These and other objects, features and advantages of the present disclosure will become more apparent upon reading of the following detailed description along with the accompanied drawings.

BRIEF DESCRIPTION OF THE DRAWINGS

FIG. 3 shows a diagram which indicates an example of the block property data;

FIG. 4 shows a diagram which indicates an example of a dot pattern table for a block image having non-character attribute;

FIG. 5 shows a diagram which indicates an example of a dot pattern table for a block image having character attribute;

FIG. 6 shows a diagram which indicates an example of a dot pattern table for a preregistered block image;

FIG. 7 shows a diagram which indicates an example of a toner adhesion amount table for a block image having non-character attribute;

FIG. 8 shows a diagram which indicates an example of a toner adhesion amount table for a block image having character attribute;

FIG. 9 shows a diagram which indicates an example of a toner adhesion amount table for a preregistered block image;

DETAILED DESCRIPTION

Hereinafter, an embodiment according to an aspect of the present disclosure will be explained with reference to drawings.

Figure 1:
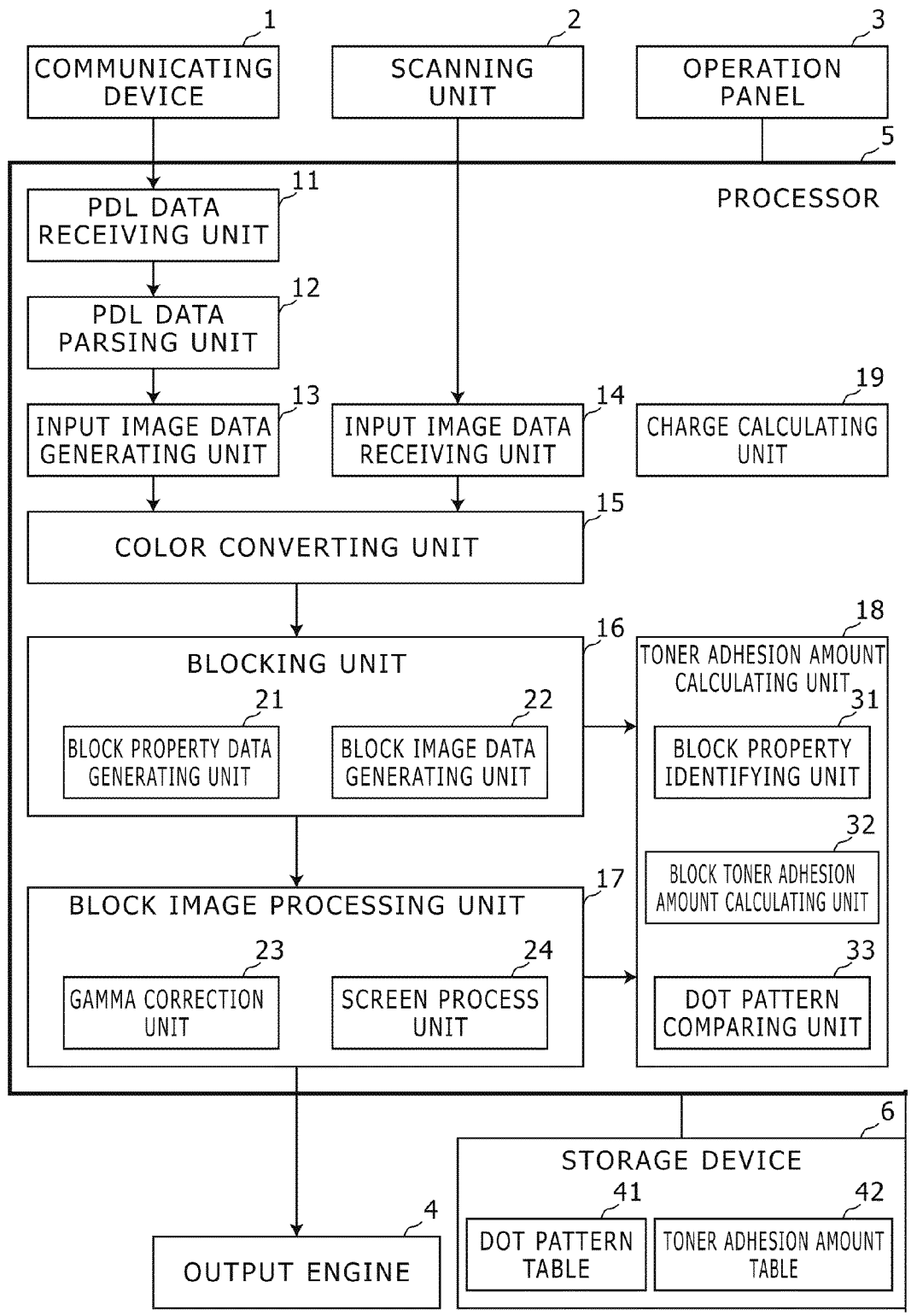
FIG. 1 shows a block diagram which indicates a configuration of an image forming apparatus according to an embodiment of the present disclosure.
Figure 2:
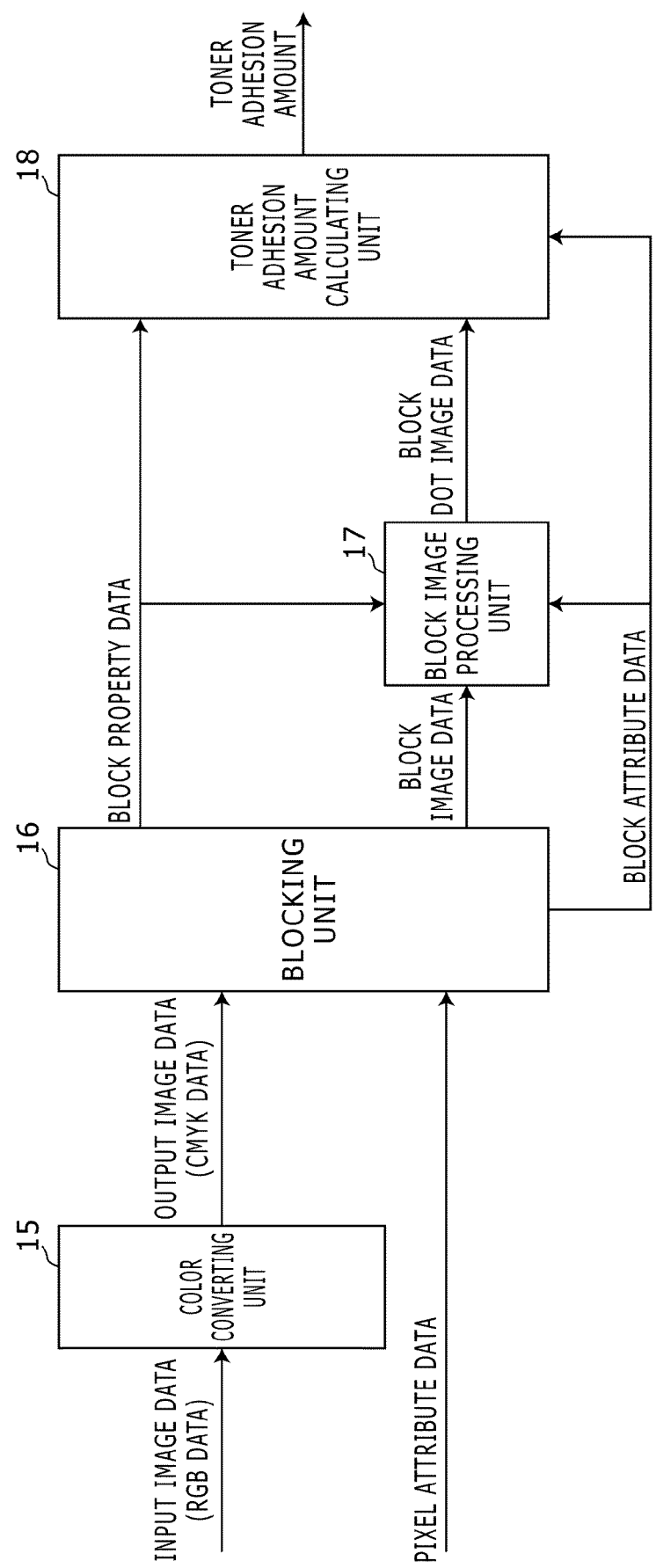
FIG. 2 shows a block diagram which indicates a data flow in the image forming apparatus shown in FIG. 1.

FIG. 1 shows a block diagram which indicates a configuration of an image forming apparatus according to an embodiment of the present disclosure. FIG. 2 shows a block diagram which indicates a data flow in the image forming apparatus shown in FIG. 1. The image forming apparatus shown in FIG. 1 is, for example, a printer, a copier, a multi function peripheral, or the like.

The image forming apparatus shown in FIGS. 1 and 2 includes a communicating device 1, a scanning unit 2, an operation panel 3, an output engine 4, a processor 5, and a storage device 6.

The communicating device 1 is a communicating device of a network or a peripheral device interface, and is an internal device which performs data communication with an unshown host device. The scanning unit 2 is an internal device which optically scans an image of a document and outputs the image as an electric signal. The operation panel 3 is a user interface which includes a display device such as a crystal liquid display and an input device such as a touch panel. The output engine 4 includes development devices of predetermined toner colors (here, four colors of Cyan (C), Magenta (M), Yellow (Y), and Black (K)) and performs printing an image with an electrophotographic method using the development device.

For example, if the image forming apparatus includes an indirect transfer system, the output engine 4 includes a photo conductor drum, an exposure device, and a development device for each toner color, and (a) forms an electrostatic latent image based on dot image data on the photo conductor drum using the exposure device, (b) makes toner adhere on the electrostatic latent image to form a toner image using the development device, (c) transfers the toner image from the photo conductor drum to an intermediate transfer belt, (d) transfers the toner image from the intermediate transfer belt to a paper sheet, and (e) fixes the toner image on the paper sheet using a fuser.

The processor 5 includes an ASIC (Application Specific Integrated Circuit) and/or a computer which includes a CPU (Central Processing Unit), a ROM (Read Only Memory), a RAM (Random Access Memory) and so forth, and is a device which forms processing units using hardware and/or software. The storage device 6 is a non volatile storage device and stores sorts of data. The storage device 6 may be included in the processor 5.

The processor 5 forms a PDL data receiving unit 11, a PDL data parsing unit 12, an input image data generating unit 13, an input image data receiving unit 14, a color converting unit 15, a blocking unit 16, a block image processing unit 17, a toner adhesion amount calculating unit 18, and a charge calculating unit 19.

In the storage device 6, a dot pattern table 41 and a toner adhesion amount table 42 are stored in advance.

The PDL data receiving unit 11 receives PDL (Page Description Language) data from an unshown host device using the communicating device 1.

The PDL data parsing unit 12 parses the PDL data received by the PDL data receiving unit 11.

The input image data generating unit 13 generates input image data on the basis of a parsing result of the PDL data by the PDL data parsing unit 12. For example, the input image data is 8-bit RGB data.

The input image data receiving unit 14 receives data of a document image from the scanning unit 2 by controlling the scanning unit 2, and outputs it as input image data.

The color converting unit 15 converts the input image data (RGB data) to output image data (CMYK data). The output image data is divided into respective color planes of CMYK. Further, a resolution of the output image data is identical to a resolution of the input image data.

It should be noted that the color plane of the output image corresponds to each toner color of toner used in this image forming apparatus.

The blocking unit 16 converts a resolution of an output image to a printing resolution and generates block property data for each block image of a predetermined size obtained by dividing a color plane of the output image of the printing resolution, and further generates block image data if necessary. For example, when the printing resolution is 600 dpi and the resolution of the output image is 200 dpi, the block property data and the block image data are generated of block images of the output image enlarged by 3 times.

Further, from pixel attribute data obtained together with the input image data, the blocking unit 16 generates block attribute data of each black image, and provides the block attribute data to the block image processing unit 17 and the toner adhesion amount calculating unit 18. The block attribute data indicates which of character attribute and non-character attribute the block image has.

This blocking unit 16 includes a block property data generating unit 21 and a block image data generating unit 22.

The block property data generating unit 21 generates first block property data (hereinafter also called as "non-white flag") having a first value that indicates that all pixels in a block image of a predetermined size obtained by dividing a color plane of an output image do not have a color of the color plane if all pixels in the block image do not have a color of the color plane, and (b) generates first block property data having a second value that indicates that at least one pixel in the block image has a color of the color plane if at least one pixel in the block image has a color of the color plane. The second value is different from the first value, and here, the first value is zero, and the second value is 1.

Further, the aforementioned size of the block image is identical to a size of a screen in a screen process mentioned below. Here the size has the width of 4 pixels and the height of 4 pixels.

The block image data generating unit 22 (a) generates block image data that has a color value of each pixel in the block image if at least one pixel in the block image has a color of the color plane and all pixels in the block image do not have a single color value, and (b) if at least one pixel in the block image has a color of the color plane and all pixels in the block image have a single color value, generates second block property data having the single color value (hereinafter, called as "fill color value") without generating the block image data. In this embodiment, if all pixels in the block image do not have a single color value, the second block property data is set as zero.

FIG. 3 shows a diagram which indicates an example of the block property data. The block property data includes a color plane attribute (any of CMYK), block coordinates, a non-white flag, a fill color value, and a block image data address of each block image.

The first block property data D1 (non-white flag) is set as zero if all pixels in the block image do not have a color of the color plane, and is set as 1 if all pixels in the block image have a color of the color plane.

The second block property data D2 is set as a fill color value if all pixels in the block image have a single color, and otherwise is set as zero. However, if the non-white flag is zero, the second block property data D2 is always set as zero.

The block image data address indicates a top address of a memory area in which the block image data is stored in the RAM. If the block image data is not generated, the block image data address is set as zero.

The block image processing unit 17 includes a gamma correction unit 23 and a screen process unit 24.

The gamma correction unit 23 performs gradation correction compatible with a characteristic of the output engine 4 for each color plane of an output image. The gamma correction unit 23 performs gamma correction for the block image having the second value (i.e. the block image having a color) and does not perform gamma correction for the block image having the first value.

Further, the gamma correction unit 23 (a) performs gamma correction for a fill color value if the second block property data of the block image has the fill color value, and (b) performs gamma correction for each pixel in the block image data if the second block property data of the block image does not have the fill color value.

The screen process unit 24 generates a block dot image by performing a screen process for the block image for which the gamma correction has been performed, and outputs it as block dot image data.

In this embodiment, the screen process unit 24 generates a dot image having 16-level gradation using a screen size of the 4 pixel width and the 4 pixel height, and the output engine 4 sets a size of each dot (i.e. an exposure pulse width) as any of the 16 levels correspondingly to a value of the block dot image data.

Therefore, the size of the block dot image has the 4 pixel width and the 4 pixel height, and the block dot image data includes a value expressed in 4 bits (i.e. 0 to 15) on each pixel.

The toner adhesion amount calculating unit 18 includes a block property identifying unit 31, a block toner adhesion amount calculating unit 32, and a dot patter comparing unit 33.

In order to calculate a toner adhesion amount of an objective block image in a color plane, the block property identifying unit 31 reads the first block property data of plural block images adjacent to the objective block image, and identifies values that the first block property data have.

The block toner adhesion amount calculating unit 32 identifies the toner adhesion amount of the object block as a value changed correspondingly to the identified values of the first block property data.

In this embodiment, the block toner adhesion amount calculating unit 32 identifies the toner adhesion amount of the objective block image as a value different from a predetermined standard value if the first block property data of two block images adjacent to the objective block image in either a width direction or a height direction have the first value (i.e. if all of these adjacent block images do not have any colors).

This standard value is a value identified from a value of a toner adhesion amount per unit area in an output image which has a single color value in some experiments. In this embodiment, for each color value, a value of a toner adhesion amount in an area of one pixel at a predetermined printing resolution is derived from the value of a toner adhesion amount per unit area in advance, and is registered in a toner adhesion amount table 42 mentioned below.

Further, in this embodiment, the block toner adhesion amount calculating unit 32 identifies the toner adhesion amount of the objective block image as a value different from the standard value if the first block property data of four block images adjacent to the objective block image in a width direction and a height direction have the first value.

Furthermore, the block toner adhesion amount calculating unit 32 identifies the toner adhesion amount of the objective block image as the standard value if the first block property data of at least a block image adjacent to the objective block image in the height direction and the first block property data of at least a block image adjacent to the objective block image in the width direction have the second value (i.e. if at least one of these adjacent block images has a color).

The block dot pattern comparing unit 33 identifies a dot pattern of the block dot image data if the second block property data of the objective block image is not set.

The block toner adhesion amount calculating unit 32 identifies the toner adhesion amount of the objective block image on the basis of the dot pattern identified by the block dot pattern comparing unit 33. If the second block property data of the block image has a fill color value, the block toner adhesion amount calculating unit 32 identifies the toner adhesion amount of the objective block image on the basis of the fill color value of the second block property data, without identifying a dot pattern of the block dot image data (without comparing with dot patterns in a dot pattern table 42 mentioned below).

The dot pattern table 41 includes data which indicates a relationship between dot patterns of block dot images and color values of its block images. The toner adhesion amount table 42 includes data indicates relationships between color values corresponding to dot patterns and toner adhesion amounts (values of toner adhesion amounts per pixel at a predetermined printing resolution) and between color values of the second block property data and the toner adhesion amounts. Thus, using the dot pattern table 41 and the toner adhesion amount table 42, relationships are identified between dot patterns and toner adhesion amounts and between color values of the second block property data and toner adhesion amounts.

In addition, in this embodiment, used are (a) a dot pattern table 41 and a toner adhesion amount table 42 for a block image having non-character attribute, (b) a dot pattern table 41 and a toner adhesion amount table 42 for a block image having character attribute, and (c) a dot pattern table 41 and a toner adhesion amount table 42 for a preregistered dot pattern.

FIG. 4 shows a diagram which indicates an example of a dot pattern table 41 for a block image having non-character attribute. FIG. 5 shows a diagram which indicates an example of a dot pattern table 41 for a block image having character attribute. FIG. 6 shows a diagram which indicates an example of a dot pattern table 41 for a preregistered block image.

FIG. 7 shows a diagram which indicates an example of a toner adhesion amount table 42 for a block image having non-character attribute. FIG. 8 shows a diagram which indicates an example of a toner adhesion amount table 42 for a block image having character attribute. FIG. 9 shows a diagram which indicates an example of a toner adhesion amount table 42 for a preregistered block image.

In the toner adhesion amount tables 42 shown in FIGS. 7 to 9, toner adhesion amounts have been registered corresponding to both a color value before gamma correction and a color value after gamma correction.

It should be noted that the dot pattern tables 41 and the toner adhesion tables 42 shown in FIGS. 4, 5, 7, and 8 are for a block image in which color values of all pixels are constant; and a dot pattern and a toner adhesion amount for another block image are appropriately registered in the dot pattern table 41 and the toner adhesion amount table 42 shown in FIGS. 6 and 9 in advance.

Further, a color value after gamma correction corresponding to a color value before gamma correction may be changed through gradation calibration. Therefore, when a color value after gamma correction corresponding to a color value before gamma correction is changed through a gradation calibration, a dot pattern in the dot pattern table 41 and/or a process condition is/are set so as to make a toner adhesion amount by a color value after gamma correction equal to a toner adhesion amount by a color value before gamma correction.

The block toner adhesion amount calculating unit 32 identifies a value of a toner adhesion amount of the objective block image on the basis of the identified dot pattern by referring to the dot pattern table 41 and the toner adhesion amount table 42. Here, the block toner adhesion amount calculating unit 32 selects the dot pattern table 41 and the toner adhesion amount table 42 corresponding to a value of block attribute data of the objective block image, and identifies the toner adhesion amount using the selected dot pattern table 41 and the selected toner adhesion amount table 42.

Further, the block toner adhesion amount calculating unit 32 identifies a value of a toner adhesion amount of the objective block image on the basis of a color value of the second block property by referring to the toner adhesion amount table 42. Here, the block toner adhesion amount calculating unit 32 selects the toner adhesion amount table 42 corresponding to a value of block attribute data of the objective block image, and identifies the toner adhesion amount using the selected toner adhesion amount table 42.

In this embodiment, the toner adhesion amount table 42 includes plural toner adhesion amounts corresponding to plural patterns of values of plural adjacent block images for each one of dot patterns (i.e. color values corresponding to dot patterns) and each one of fill color values of the second block property data.

For example, the toner adhesion amount table 42 includes (a) a standard value, (b) a toner adhesion amount in a case that values of the first block property data of two block images adjacent to an objective block image in a width direction (i.e. in the left side and the right side) are the first value, (c) a toner adhesion amount in a case that values of the first block property data of two block images adjacent to an objective block image in a height direction (i.e. in the up side and the down side) are the first value, and (d) a toner adhesion amount in a case that values of the first block property data of four block images adjacent to an objective block image in a width direction and a height direction (i.e. in the left side, the right side, the up side, and the down side) are the first value.

Further, the block toner adhesion amount calculating unit 32 identifies a toner adhesion amount as a value corresponding to a pattern of values of the first block property data of plural block images adjacent to the objective block image by referring to the toner adhesion amount table 42.

Further, if respective ones of all pixels in the block image have a color value of 0 or a maximum value, the block toner adhesion amount calculating unit 32 identifies the toner adhesion amount of the objective block image on the basis of the number of pixels having the maximum value and a toner adhesion amount per pixel having the maximum value, without identifying a dot pattern of the block dot image data.

Further, the charge calculating unit 19 calculates a charging amount on the basis of the number of printed pages, the number of used paper sheets, the toner adhesion amount, and so forth.

In the following part, a behavior of the aforementioned image forming apparatus is explained.

As mentioned, the blocking unit 16 generates block property data of each block image; and if all pixels in the block image have a single color value, the blocking unit 16 generates block image data of the block image and stores these data in an unshown RAM.

Further, in the block image processing unit 17, for each block image, the gamma correction unit 23 performs gamma correction of either a fill color value or block image data, and the screen process unit 24 generates block dot image data corresponding to either the fill color image or the block image data after the gamma correction.

The toner adhesion amount calculating unit 18 identifies a toner adhesion amount of each block (here, of the 4 pixel width and the 4 pixel height) on the basis of these data.

Figure 10:
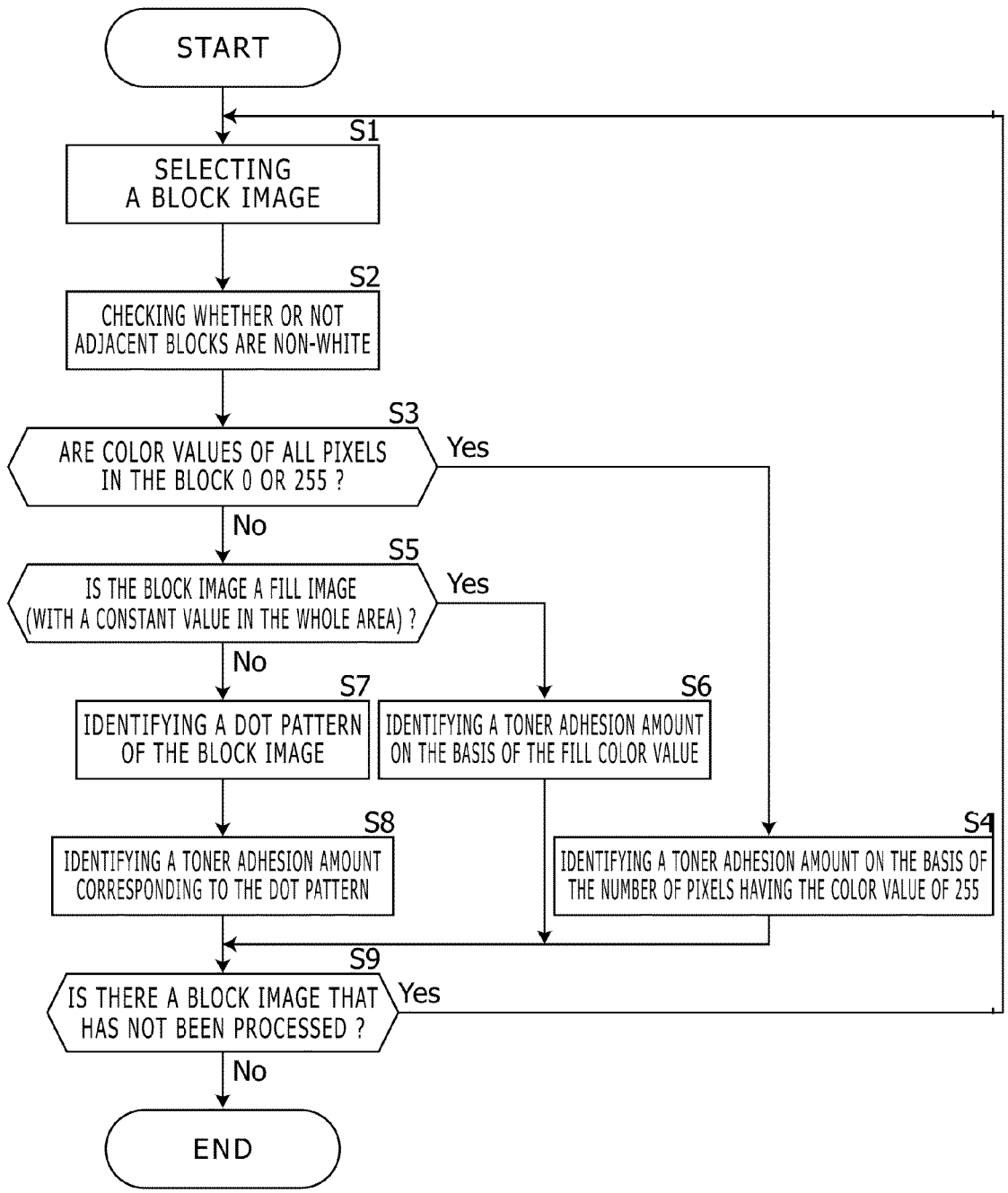
FIG. 10 shows a flowchart which explains a behavior of the toner adhesion amount calculating unit in FIGS. 1 and 2.

FIG. 10 shows a flowchart which explains a behavior of the toner adhesion amount calculating unit 18 in FIGS. 1 and 2.

The toner adhesion amount calculating unit 18 selects one of block images of which a toner adhesion amount has not been calculated yet (i.e. an unprocessed block image) as an objective block image (Step S1). Each block image is specified with block coordinates shown in FIG. 3. Specifically, the toner adhesion amount calculating unit 18 selects a block image to be processed on the basis of the block coordinates in turn.

The block property identifying unit 31 reads non-white flags of four block images adjacent to the objective block image in the left side, the right side, the up side, and the down side (Step S2).

Further, the block toner adhesion calculating unit 32 identifies whether or not respective ones of all pixels in the objective block image have the color value of 0 or the color value of 255 by referring to a fill color value or block image data of the objective block image (Step S3).

If respective ones of all pixels in the objective block image have a color value of 0 or a color value of 255, then the block toner adhesion calculating unit 32 identifies (a) the number of the pixels having the color value of 255 in the objective block image and (b) a toner adhesion amount corresponding to the color values of 255 in the toner adhesion amount table 42, and determines a toner adhesion amount of the objective block image as the product of the identified number of the pixels and the identified toner adhesion amount (Step S4).

Otherwise, if at least one of all pixels in the objective block image has a color value other than the color values of 0 and 255, then the block toner adhesion calculating unit 32 identifies whether or not all pixel values in the objective block image are constant (Step S5).

If all pixel values in the objective block image are constant (specifically, if a non-white flag of the objective block image has the second value (=1) and a fill color value of the objective block image is a value other than zero), then the block toner adhesion calculating unit 32 identifies a toner adhesion amount corresponding to the fill color value and values of non-white flags of adjacent block images by referring to the toner adhesion amount table 42, and identifies a toner adhesion amount of the objective block image as a value obtained by multiplying the number of pixels (=16) in the objective block image by the identified toner adhesion amount from the toner adhesion amount table 42 (Step S6).

If the fill color value stored in the RAM or the like is one before gamma correction, a value of a toner adhesion amount is selected corresponding to a color value before gamma correction that coincides with this fill color value in the toner adhesion amount table 42 shown in FIGS. 7 and 8. Otherwise, if the fill color value stored in the RAM or the like is one after gamma correction, a value of a toner adhesion amount is selected corresponding to a color value after gamma correction that coincides with this fill color value in the toner adhesion amount table 42 shown in FIGS. 7 and 8.

Otherwise, if all pixel values in the objective block image are not constant, then the dot pattern comparing unit identifies a dot pattern in a block dot image corresponding to the objective block image on the basis of block dot image data of the objective block image, and identifies a color value corresponding to the dot pattern by referring to the dot pattern table 41 (Step S7). Subsequently, the block toner adhesion calculating unit 32 identifies a toner adhesion amount corresponding to the identified color value and values of non-white flags of adjacent block images by referring to the toner adhesion amount table 42, and identifies a toner adhesion amount of the objective block image as a value obtained by multiplying the number of pixels (=16) in the objective block image by the identified toner adhesion amount from the toner adhesion amount table 42 (Step S8).

At this time, since block dot image data is obtained from a block image after gamma correction, in the toner adhesion amount table 42 shown in FIGS. 7 and 8, a value of a toner adhesion amount is selected corresponding to a color value before gamma correction that coincides with the color value identified with the dot pattern table 41 shown in FIGS. 4 and 5.

If the identified dot pattern is a preregistered dot pattern (in FIG. 6), an ID related to the dot pattern is identified on the basis of the dot pattern table 41, and a value of a toner adhesion amount related to the identified ID is used on the basis of the toner adhesion amount table 42.

Upon identifying a toner adhesion amount of the objective block image, the toner adhesion calculating unit 18 identifies whether or not there is an unprocessed block image (Step S9), and if there is an unprocessed block image, returning to Step S1, the toner adhesion calculating unit 18 selects a next objective block image and performs the subsequent process to Step S1.

Afterward, when there are no unprocessed block images, this process is finished, and a toner adhesion amount of one output image is calculated as the sum of toner adhesion amounts of all block images. Subsequently, the calculated toner adhesion amount is outputted to another processing unit such as the charge calculating unit 19, the operation panel 3, and so forth.

Here an example of a toner adhesion amount of a block image is explained.

Figure 11A:
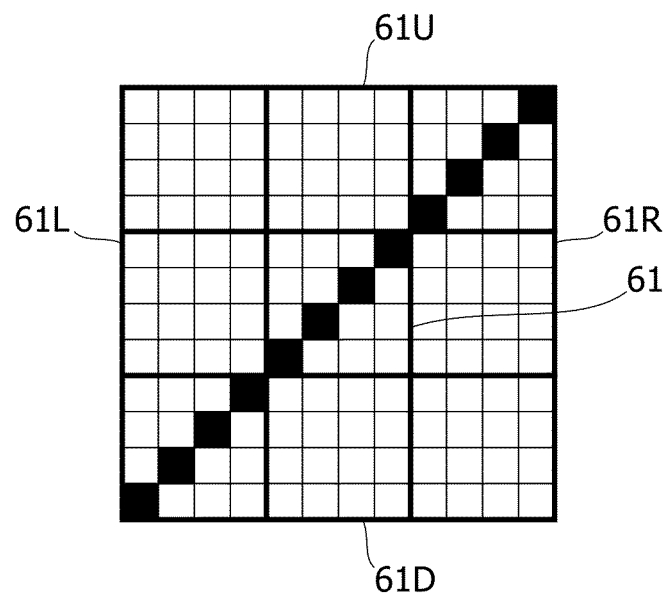
FIGS. 11A and 11B show an example of an output image which includes an oblique thin line of the width of 1 pixel and the color value of 255.
Figure 11B:
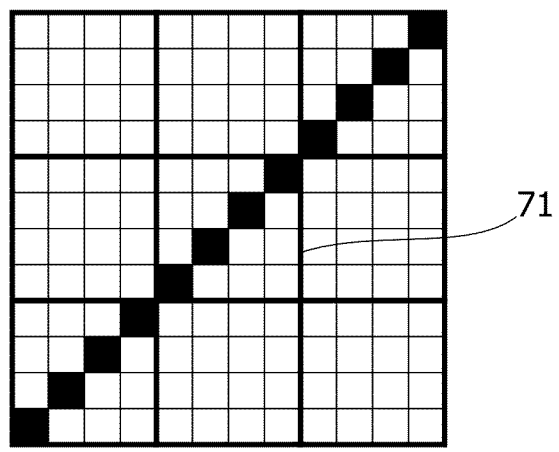

FIGS. 11A and 11B show an example of an output image which includes an oblique thin line of the width of 1 pixel and the color value of 255. FIG. 11A shows the output image of this example, and FIG. 11B shows a block dot image obtained by screening each one of blocks in the output image shown in FIG. 11A. The block dot image 71 is generated from the block image 61, and includes an oblique thin line of the width of 1 pixel and the value of 15.

In this case, since respective ones of all pixels in the objective block image 61 have a color value of 0 or a color value of 255, the block toner adhesion amount calculating unit 32 identifies a toner adhesion amount corresponding to the color value of 255 by referring to the toner adhesion amount table 42. For example, if the objective block image 61 has character attribute, the toner adhesion amount is identified as 0.0948 micro gram per pixel corresponding to the color value of 255 in the toner adhesion amount table 42 shown in FIG. 8. Therefore, the block toner adhesion amount calculating unit 32 multiplies the number of pixels having the color value of 255 (=4) by this toner adhesion amount 0.0948 micro gram per pixel, and identifies a toner adhesion amount of the objective block image 61 as 0.379 micro gram.

Figure 12A:
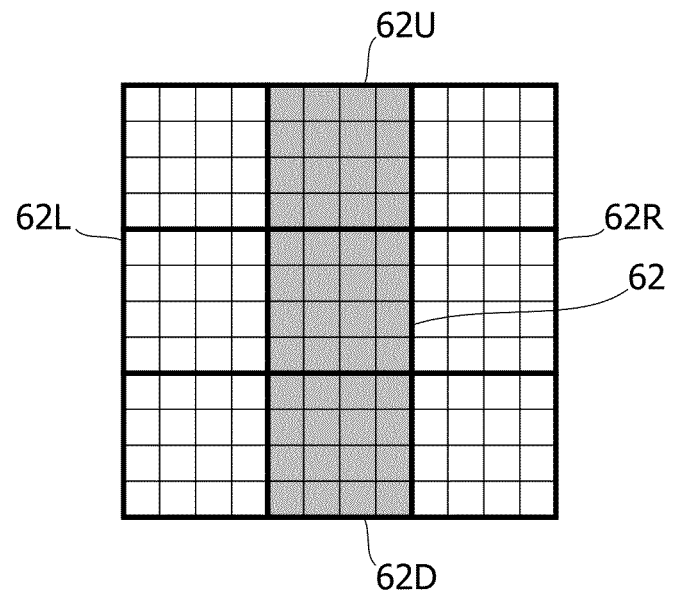
FIGS. 12A and 12B show an example of an output image which includes an area of the width of 4 pixels and the color value of 64 extending in a height direction.
Figure 12B:
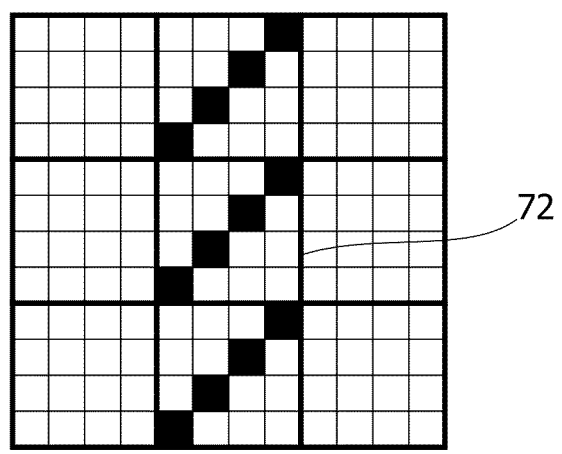

FIGS. 12A and 12B show an example of an output image which includes an area of the width of 4 pixels and the color value of 64 extending in a height direction. FIG. 12A shows the output image of this example, and FIG. 12B shows a block dot image obtained by screening each one of blocks in the output image shown in FIG. 12A. The block dot image 72 is generated from the block image 62, and includes an oblique thin line of the width of 1 pixel and the value of 15.

In this case, since all pixels in the objective block image 62 have a single color value, and its fill color value before gamma correction is 64, non-white flags of adjacent block images 62U and 62D in the up side and the down side are 1, and non-white flags of adjacent block images 62L and 62R in the left side and the right side are 0, if the objective block image 61 has character attribute, the block toner adhesion amount calculating unit 32 identifies a toner adhesion amount as 0.0235 micro gram per pixel in the toner adhesion amount table 42 shown in FIG. 7 in the case that the fill color value before gamma correction is 64 and the non-white flags in the left side and the right side are zero. Therefore, the block toner adhesion amount calculating unit 32 multiplies the number of pixels in the block image (=16) by this toner adhesion amount 0.0235 micro gram per pixel, and identifies a toner adhesion amount of the objective block image 62 as 0.376 micro gram.

In the aforementioned embodiment, for a block image, the blocking unit 16 (a) generates first block property data having a predetermined first value if all pixels in the block image do not have the color, and (b) generates first block property data having a predetermined second value if at least one pixel in the block image has the color. In order to calculate a toner adhesion amount of an objective block image, the toner adhesion amount calculating unit 18 identifies values of the first block property data of plural block images adjacent to the objective block image, and identifies the toner adhesion amount of the object block as a value changed correspondingly to the identified values of the first block property data.

Therefore, a toner adhesion amount of an objective block image is identified with consideration to properties of block images in a surrounding area of the objective block image in a simple process using the block property data generated to efficiently perform gamma correction and a screen process for each block image, and consequently, the toner adhesion amount is more precisely identified in a short computation time.

The description has been presented for purposes of illustration and description, and is not intended to be exhaustive or limited to the present disclosure.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   a blocking unit configured (a) to generate first block property data having a first value that indicates that all pixels in a block image of a predetermined size obtained by dividing a color plane of an output image do not have a color of the color plane if all pixels in the block image do not have a color of the color plane, and (b) to generate first block property data having a second value that indicates that at least one pixel in the block image has a color of the color plane if at least one pixel in the block image has a color of the color plane;
   a gamma correction unit configured to perform gamma correction for the block image having the second value and not to perform gamma correction for the block image having the first value;
   a screen process unit configured to generate a block dot image by performing a screen process for the block image for which the gamma correction has been performed; and
   a toner adhesion amount calculating unit configured, in order to calculate a toner adhesion amount of an objective block image in a color plane, (a) to identify values of the first block property data of plural block images adjacent to the objective block image, and (b) to identify the toner adhesion amount of the object block as a value changed correspondingly to the identified values of the first block property data.

2. The image forming apparatus according to claim 1, wherein the toner adhesion amount calculating unit is further configured (a) to identify the toner adhesion amount of the objective block image as a value different from a predetermined standard value if the first block property data of two block images adjacent to the objective block image in either a width direction or a height direction have the first value, and (b) to identify the toner adhesion amount of the objective block image as the standard value if the first block property data of at least a block image adjacent to the objective block image in the height direction and the first block property data of at least a block image adjacent to the objective block image in the width direction have the second value.

3. The image forming apparatus according to claim 1, wherein the toner adhesion amount calculating unit is further configured (a) to identify the toner adhesion amount of the objective block image as a value different from a predetermined standard value if the first block property data of four block images adjacent to the objective block image in a width direction and a height direction have the first value, and (b) to identify the toner adhesion amount of the objective block image as the standard value if the first block property data of at least a block image adjacent to the objective block image in the height direction and the first block property data of at least a block image adjacent to the objective block image in the width direction have the second value.

4. The image forming apparatus according to claim 1, wherein:
- the blocking unit is further configured (a) to generate block image data that has a color value of each pixel in the block image if at least one pixel in the block image has a color of the color plane and all pixels in the block image do not have a single color value, and (b) if at least one pixel in the block image has a color of the color plane and all pixels in the block image have a single color value, to generate second block property data having the single color value without generating the block image data;
- the gamma correction unit is further configured (a) to perform gamma correction for the value of the second block property data if the second block property data of the block image has the color value, and (b) to perform gamma correction for each pixel in the block image data if the second block property data of the block image does not have the color value; and
- the toner adhesion amount calculating unit is further configured (a) to identify a dot pattern of the block dot image data and identify the toner adhesion amount of the objective block image on the basis of the identified dot pattern if the second block property data of the block image does not have the color value, and (b) to identify the toner adhesion amount of the objective block image on the basis of the color value of the second block property data if the second block property data of the block image has the color value.

5. The image forming apparatus according to claim 4, further comprising a toner adhesion amount table configured to indicate relationships between dot patterns and toner adhesion amounts and between color values of the second block property data and toner adhesion amounts;
- wherein the toner adhesion amount calculating unit is further configured to identify the toner adhesion amount of the block image corresponding to the identified dot pattern by referring to the toner adhesion amount table, and identify the toner adhesion amount of the block image corresponding to the color value of the second block property data by referring to the toner adhesion amount table.

6. The image forming apparatus according to claim 5, wherein:
- the toner adhesion amount table includes plural toner adhesion amounts corresponding to plural patterns of values of plural adjacent block images for each one of the dot patterns and each one of the color values of the second block property data; and
- the toner adhesion amount calculating unit is further configured to identify the toner adhesion amount with consideration to a pattern of values of plural block images adjacent to the objective block image by referring to the toner adhesion amount table.

7. The image forming apparatus according to claim 4, wherein the toner adhesion amount calculating unit is further configured, if respective ones of all pixels in the block image have a color value of 0 or a maximum value, to identify the toner adhesion amount of the objective block image on the basis of the number of pixels having the maximum value and a toner adhesion amount per pixel having the maximum value, without identifying a dot pattern of the block dot image data.

8. The image forming apparatus according to claim 1, wherein the predetermined size of the block image is identical to a size of a screen in the screen process.

9. The image forming apparatus according to claim 1, wherein the color plane of the output image corresponds to each toner color of toner used in this image forming apparatus.

* * * * *